Figure 1:
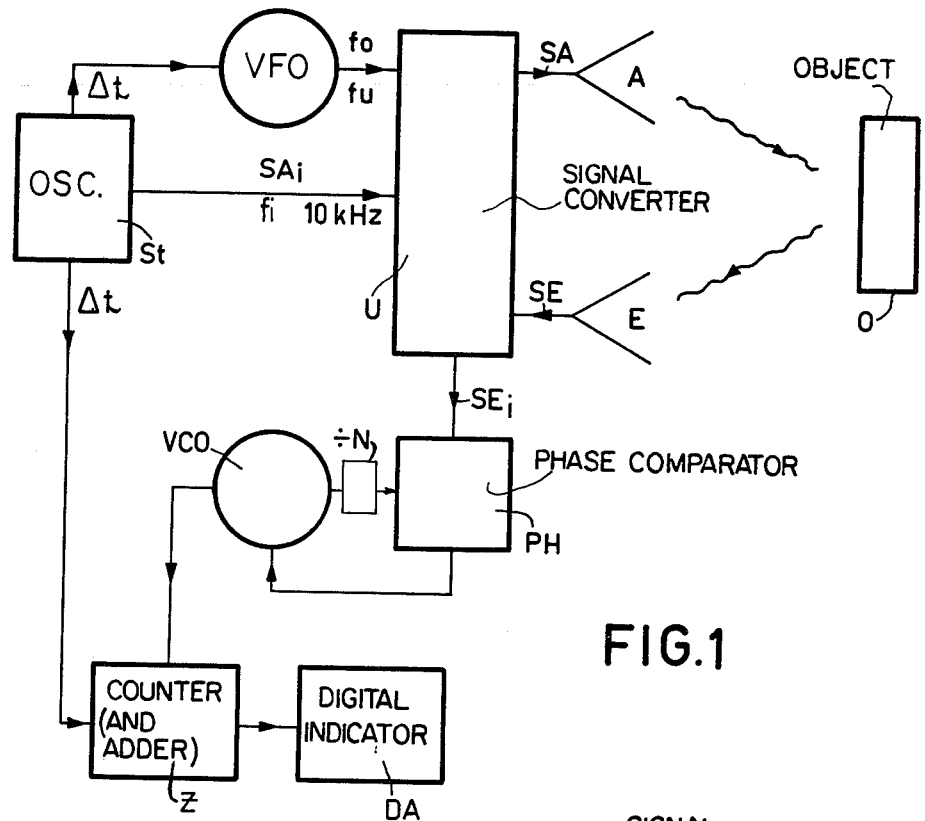

United States Patent [19]

Schiek et al.

[11] 4,238,795
[45] Dec. 9, 1980

[54] MICROWAVE RANGE MEASURING SYSTEM FOR MEASURING THE DISTANCE OF AN OBJECT

[75] Inventors: Burkhard Schiek, Halstenbek; Wolfram Schilz, Norderstedt; Rolf Jacobson, Hamburg, all of Fed. Rep. of Germany

[73] Assignee: U.S. Philips Corporation, New York, N.Y.

[21] Appl. No.: 954,275

[22] Filed: Oct. 24, 1978

[30] Foreign Application Priority Data

Oct. 27, 1977 [DE] Fed. Rep. of Germany ....... 2748124

[51] Int. Cl.³ .................. G01S 13/26; G01S 13/34
[52] U.S. Cl. ........................................... 343/14; 343/17.5
[58] Field of Search ............... 343/12 R, 12 A, 14, 343/17.5; 356/5

[56] References Cited
U.S. PATENT DOCUMENTS

| | | | |
|---|---|---|---|
| 3,113,309 | 12/1963 | Kuecken | 343/14 |
| 3,191,171 | 6/1965 | Zuefeldt et al. | 343/12 R |
| 3,542,472 | 11/1970 | Vaniz | 343/14 |
| 3,649,123 | 3/1972 | Ulicki | 356/5 |
| 3,778,160 | 12/1973 | Wolcott | 356/5 |

*Primary Examiner*—Stephen C. Buczinski
*Attorney, Agent, or Firm*—Simon L. Cohen

[57] ABSTRACT

Disclosed is a microwave range measuring system for determing the distance to an object by means of the phase difference between a transmitted frequency-modulated wave and the wave reflected by and received from the object. The frequency of the transmitted microwave signal is varied between two fixed frequencies $f_u$ and $f_o$ and the signal reflected by and received from the object is converted by means of a signal converter into an intermediate frequency signal from whose total phase shift the distance is derived.

5 Claims, 2 Drawing Figures

MICROWAVE RANGE MEASURING SYSTEM FOR MEASURING THE DISTANCE OF AN OBJECT

The invention relates to a microwave range measuring system for measuring the distance of an object by means of the phase difference between a transmitted frequency-modulated wave and the wave reflected by and received from the object.

The methods which are based on the principle of frequency modulation of continuously transmitted waves impose high requirements on the linearity and the variation as a function of the time of the frequency modulation, respectively, particularly when a fairly high accuracy of the range measuring values is required, because these methods operate with a phase shifter or phase modulator, the reflected and received signal being mixed with the transmitted signal. From U.S. Pat. Nos. 3,249,938 and 2,528,109 it is known to arrange such a phase shifter between the transmitter and the receiver. Possibly, the phase of an intermediate frequency oscillator can alternatively be modulated first.

From German Pat. No. 2,438,116, which was laid open to public inspection, it is further known to change the phase of an intermediate frequency signal step-wise or monotonic and by deriving the range measurement by determining the phase difference between this intermediate frequency wave and the demodulated received intermediate frequency wave.

It is an object of the invention to provide a simpler and quicker microwave measuring system without a phase shift.

According to the invention this is accomplished because the transmitted microwave signal is formed by two auxiliary signals each having a fixed frequency $f_u$ and $f_o$, respectively, and an accurately defined frequency difference $f_u - f_o$. The signal reflected by and received from the object is converted by means of a signal converter into an intermediate frequency signal from whose total phase shifts the distance is derived.

Although it is even permissible in the novel microwave measuring system that the frequency does not change monotonously within a measuring cycle, measuring values which are accurate to a centimeter or to a millimeter can be obtained and displayed.

To determine the phase shift it is efficient to use a phase comparison stage to which the intermediate frequency signal and a signal, divided by a factor of N, of a voltage-controlled oscillator are applied and that the produced error signal controls the voltage-controlled oscillator so that the phase of the voltage-controlled oscillator is precisely the N-fold of the phase of the intermediate frequency signal.

The novel microwave measuring system is particularly suited for measuring distances of a few meters, for example for height measurements in silos, bunkers etc. as well as for depth measurements in blast furnaces.

Figure 2:
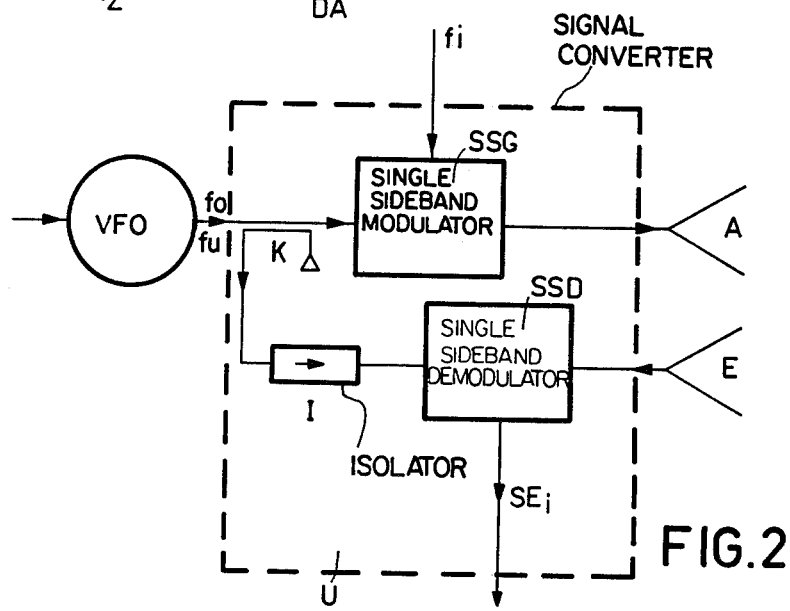

Some embodiments are shown in the drawing, wherein:

FIG. 1 shows an implementation in schematic form,
FIG. 2 is a circuit diagram of the converter.

In the system shown in FIG. 1, a microwave signal $S_A$ of frequency f is transmitted via a transmitting antenna A and the signal reflected by an object O is received by a receiving antenna E. A signal converter U, whose construction will be described hereinafter, generates a sinusoidal intermediate frequency signal $S_{Ei}$, with a phase and amplitude which are an accurate copy of the received microwave signal $S_E$. Furthermore the signal generator St produces, a second intermediate frequency signal $S_{Ai}$ having the same frequency as signal $S_{Ei}$ and a phase equal to the phase of the transmitted microwave signal $S_A$. Of practical usage is the phase difference between $S_{Ei}$ and $S_{Ai}$. This phase difference is equal to the phase difference between $S_E$ and $S_A$. It is assumed that these phase differences are equal to $\phi_u$ at the lower transmitting frequency $f_u$ and equal to $\phi_o$ at the higher transmitting frequency $f_o$. These phase differences $\phi_u$ and $\phi_o$ can be determined from the distance d to the object and the velocity of light c. $\phi_u$ and $\phi_o$ include the multiples of $2\Delta\phi$. The phase difference is then equal to:

$$\Delta\phi = \phi_o - \phi_u = 2\pi/c(f_o - f_u) \cdot 2d = 2\pi/c \cdot \Delta f \cdot 2 \cdot d \tag{1}$$

and $\Delta\phi$, therefore, depends only on the distance and the frequency difference $f_o - f_u$, not, however, on the details of the frequency change from $f_o$ to $f_u$. By accurately measuring $\Delta\phi$, it is then possible to determine the distance d provided the frequency difference $\Delta\phi$ is kept constant. The following values hold for a practical embodiment of a device: difference $\Delta f = 200$ MHz, $f_u = 10.0$ GHz, $f_o = 10.2$ GHz. The intermediate frequency $f_i$ is 10 kHz.

If the microwave frequency is changed in, for example, one second from $f_u$ to $f_o$ the phase of the intermediate frequency signal $S_{Ei}$ changes by a certain amount $\Delta\phi$, which should be measured. This is done as follows: the frequency of, for example, 10 MHz of a voltage-controlled oscillator VCO is divided by N (for example N = 1000). In the phase comparison stage PH the signal of approximately 10 kHz then produced is compared with the phase of the signal $S_{Ei}$.

A phase difference produces a control signal for the voltage-controlled oscillator VCO. If the distance d = zero, also $\Delta\phi$ = zero and the VCO will have exactly $Z = 10^7$ cycles in one second. If, however, the distance d > o the VCO will have exactly $$10^7 + \Delta\phi/2\pi \cdot 1000 \text{ cycles}$$

during the measuring period of, for example, one second or expressed in a general formula:

$$Z = f_i N + \Delta\phi/2\pi \cdot N = f_i N + 2/c \cdot \Delta f \cdot d \cdot N \tag{2}$$

If the measuring period is $\Delta t$ instead of 1 second, then it holds:

$$Z = \Delta t \cdot f_i \cdot N + 2/c \cdot \Delta f \cdot d \cdot N \tag{3}$$

The number of cycles of the VCO can then be determined in a simple manner by means of a counter Z. The values for $\Delta t$, $f_i$ and N will then be chosen so that the expression $\Delta t \cdot f_i \cdot N$, the first or the two first figures excepted, will only contain zeroes and, in addition, $\Delta f$ and N will be chosen so that the expression $2/c \cdot \Delta f \cdot d \cdot N$ is directly calibrated in mm. This choice is always possible. For a maximum range of, for example 30 m the last 5 figures of Z give the distance in mm on the digital indicator DA.

As mentioned above a signal converter U is required which converts the received microwave signal into an intermediate frequency signal $S_{Ai}$. The principle of single sideband demodulation can be used to this end. FIG. 2 shows an embodiment of such a converter.

As shown in FIG. 2 the microwave signal of the oscillator VFO is applied to a single sideband modulator SSG, which also receives an intermediate frequency signal of the frequency $f_i$. In addition, the microwave signal is applied through a coupling device K and an isolator I to a single sideband demodulator SSD to which the reflected receiving signal is applied by way of the other input, so that the intermediate frequency signal $S_{Ei}$ is produced at the output thereof.

It holds for this signal converter that either the upper or the lower sideband can be used by means of a change-over. This achieves that the phase of the intermediate frequency signal $S_{Ei}$ is either equal to the phase $\phi$ of the received microwave signal $S_E$ or equal to $-\phi$.

This property can be used with advantage with the microwave range meter to make the measuring result insensitive to motion of the object to be measured. The Doppler effect resulting from such a motion can mainly introduce measuring errors. These errors can be suppressed to a very great extent when the number of cycles $Z_1$ is first determined for a frequency change from $f_u$ to $f_o$ and subsequently $Z_2$ for a frequency change from $f_o$ to $f_u$. The sum $Z_1+Z_2$ is then again a measure of the distance, the Doppler effect then being eliminated to a very high extent.

Also optical frequencies (infrared or visible light) can be used in an efficient manner. To this end a system as described above is first constructed, preferably in the UHF-range and subsequent thereto the HF signal is modulated on the optical carrier. The HF signal is recovered from the received optical signal by means of demodulation and further processed in a corresponding manner.

What is claimed is:

1. A microwave ranging system for measuring the distance to an object, said system comprising means for transmitting toward the object a microwave signal of a frequency which changes from a first frequency to a second frequency during a predetermined time interval, means for receiving a portion of said transmitted signal which is reflected by the object, means for converting the received signal to a first intermediate frequency signal, the phase shift of said intermediate frequency signal during said predetermined time interval being indicative of the distance to the object, and means for measuring said phase shift during said time interval.

2. The system according to claim 1 including means for generating a second intermediate frequency signal and wherein said converting means includes means for modulating the frequency of said transmitted signal with said second signal and means for demodulating said received signal to produce said first intermediate frequency signal.

3. The system according to claim 2 wherein said phase shift measuring means includes means for producing a signal of variable frequency higher than the frequency of said first intermediate frequency signal, means for dividing by a factor N the frequency of said variable frequency signal to produce a third signal and means for comparing the phase of said first signal and said third signal to produce an error signal which controls said signal producing means so that the phase of the signal produced thereby is precisely the N-fold of the phase of said first intermediate frequency signal.

4. The system according to claim 3 wherein said signal producing means is a voltage controlled oscillator and said measuring means includes means for counting the cycles of said signal produced by said oscillator during said predetermined time interval.

5. The system according to claim 4 wherein after said predetermined time period, the frequency of said microwave signal changes from said second frequency to said first frequency during a second predetermined time interval and said counting means is arranged to count the number of cycles of said signal produced by said oscillator during said second time interval, and means for adding the number of cycles counted by said counting means during said first and second time intervals.

* * * * *